July 7, 1931. A. A. BULL ET AL 1,812,927
FILTER
Filed Aug. 12, 1929
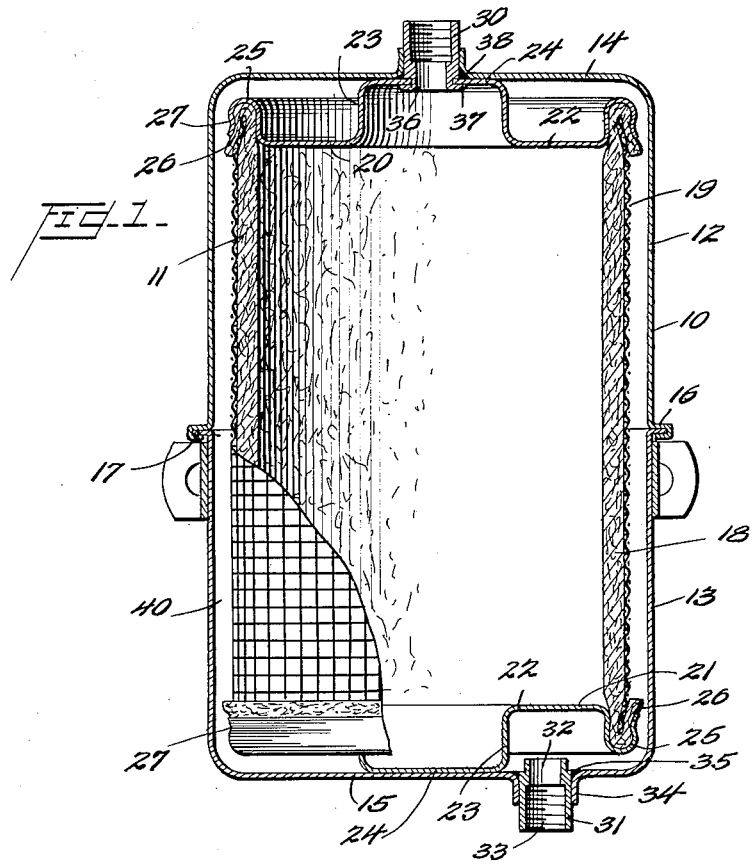
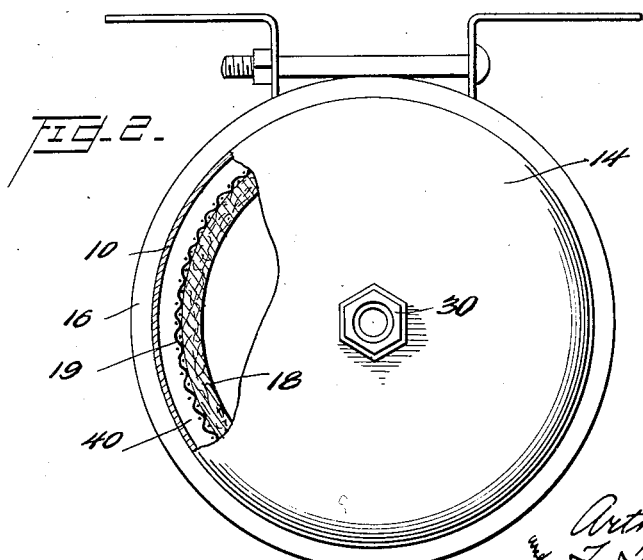
Inventor
Arthur A. Bull
& T. L. Larsen
By Watson, Cott, Morse & Grindle
Attorney

UNITED STATES PATENT OFFICE

ARTHUR A. BULL AND TORLEIF I. LARSEN, OF DETROIT, MICHIGAN, ASSIGNORS TO HANDY CLEANER CORPORATION, OF DETROIT, MICHIGAN, A CORPORATION OF MICHIGAN

FILTER

Application filed August 12, 1929. Serial No. 385,143.

This invention relates to filters for removing impurities from liquids.

It is a general object of the present invention to provide a novel and improved filter mechanism and filter assembly.

One of the important features of the invention consists in the provision of a filter unit or element in which a filter fabric is in contact with a reticulated support and in which the fabric and support are secured to carrying member by having the fabric folded over the edge of the support and compressed against it by means on the carrying member.

Another feature of the invention resides in the arrangement of a self-supporting filter element within a casing which contacts with portions of the element and supports it spaced from the walls of the casing.

A further feature of the invention resides in a novel means for attaching inlet and outlet fittings to the casing.

Other and further features and objects of the invention will be recognized by those skilled in the art upon a consideration of the accompanying drawings and following specification wherein is disclosed a single exemplary embodiment of the invention with the understanding, however, that such changes may be made therein as fall within the scope of the appended claims without departing from the spirit of the invention.

In said drawings:

Figure 1 is a longitudinal central section through a filter constructed according to the present invention; and Figure 2 is a plan view thereof, a portion being shown in horizontal section.

While the present invention is particularly shown and described in conjunction with a filter for the lubricating oil of an automotive engine, it is to be understood that it is not so limited to this use. The filter as shown is intended to be connected into the oil circulating system of an automotive engine in any of the well-known positions to filter all or part of the oil as desired. The oil is under pressure when supplied to the filter.

In accordance with drawings, it will be seen that the filter comprises two main portions, an outer casing 10, and an inner filter element assembly 11. The outer casing comprises an upper section 12 and a lower section 13 substantially identical. Each section is cup-like having a flat bottom 14, 15, respectively, and preferably circular sides each surmounted by a flange 16, 17, that on the lower section being smaller than that on the upper section. When the device is assembled, the larger flange is turned over the flange on the lower section to secure the two parts together into a complete casing. Each part of the casing may well be a stamping of sheet metal.

The filter element assembly is formed essentially to support the filter fabric 18 which may be of any suitable material, preferably a closely felted fabric. To form the filter sleeve or tube, a rectangle of this fabric is bent into a cylinder and the meeting edges sewed together and the sleeve then turned inside out to put the seam on the inside. This fabric sleeve is closely fitted within the support member 19 which may be a perforated sheet or a section of coarse screen bent into a circular or other cylinder adapted to closely engage the outer surface of the filtering cylinder. In the present filter it is intended that the flow of liquid be from within to without the cylinder so that the outer surface of the filter fabric is supported to resist the pressure of the liquid within.

The filter element assembly is completed by end closures 20 and 21 which are substantially identical stampings of sheet metal and each having a flat annular portion 22 and a cup-like portion 23 having a flat bottom 24. A peripheral groove 25 is stamped into each disk as shown to receive the upper and lower edges respectively of the filter fabric sleeve and the support sleeve. In order that a tight and leak-proof fit may be provided at this junction, the filter fabric sleeve is made longer than the support sleeve, and the projecting end portions 26 thereof are folded outwardly until they engage the outer surface of the support sleeve for a distance near its ends. In this form the ends of the composite sleeve are pressed into the grooves 25 in the end plates, which grooves normally have their walls parallel to each other and of such width that the composite sleeve can readily be positioned therein. After being positioned, the outer wall 27 of the grooves is spun or crimped inwardly to tightly compress the two thicknesses of filter fabric against the support sleeve to insure against leakage. It may be noted here that the filter fabric is pressed into the openings in the sleeve so that there can be no leakage or slippage around the fold. The whole assembly thus formed, comprising the supporting sleeve, the filter sleeve, and the end plates, is a rigid unit ready to be mounted in the casing.

The casing is provided with inlet and outlet passages, each having a fitting 30, 31, respectively. The fitting 31 is a piece of hexagon stock bored lengthwise as at 32 and having a threaded counter-bore 33 adapted for connection to a pipe or tube for the oil. The fitting is received in a sput 34 formed by pressing outwardly the metal of the lower portion of the casing to form an opening therethrough with the inner walls of the sput of the same shape and size as the outer surface of the fitting so that the fitting must be pressed into position. The hexagon shape may as well be any non-circular shape in order that the fitting will not rotate in respect to the casings when the tubing is attached. Conveniently a ring of solder or brazing 35 is run in between the fillet, at the junction of the sput and the end 15 of the lower half of the casing and the fitting, to insure oil tightness. This outlet fitting emerges from the bottom casing between the cup member 23 on the end plate and the groove at the edge of the end plate.

The inlet fitting 30 in the top is similar to the outlet fitting in the bottom but passes through a sput in the center of the top end of the casing and is secured in position in the same way. It has a reduced inner portion 36 which passes through an opening in the bottom 24 of the cup 23 and is turned over as at 37 to form a tight joint therefor. Solder or brazing 38 is arranged in the groove as shown and connects the fitting, the end plate 14, and the bottom 24 into oil-tight junction.

In assembly, the filter sleeve and support are connected to the end plates as described. The lower half of the casing has the outlet fitting secured therein, and the upper half has the inlet fitting pressed into position with the inner end straight, as shown on the outlet fitting. A ring of solder is run around in the fillet between the end plate 14 and the inner end of the fitting. The filter element assembly is positioned within the upper half of the casing, and by means of a suitable tool inserted through the opening in the fitting 30, the reduced end is headed over as at 37, and heat is applied which causes the solder to secure the three parts together. The other half of the casing is then applied and the joint spun over as at 17, either with the aid of a gasket or solder to insure tightness.

It should be noted that the filter assembly is supported and spaced from the walls of the casing by means of the cups in the end plates which provide a compartment 40 outside of the filter element assembly for filtered oil. It should be particularly noted that the type of filter unit used provides a large surface in a comparatively small volume and yet provides a maximum sludge space, for in effect the whole interior of the filter assembly is adapted for that purpose. It has been found in automotive practice that the provision of adequate sludge storage space is second to no other consideration where satisfactory filtering is to be done.

The device of the present invention is cheap to manufacture and eminently satisfactory in use. It can readily be replaced when the efficiency of the filter fabric becomes too low or the back pressure too high.

Having thus described the invention what is claimed as new and desired to be secured by Letters Patent is:

1. In a filter, in combination, a perforated support member, a filter fabric against substantially the whole area of one side of said member, one edge of said fabric extending beyond and being turned over an edge of said member, a metal plate having a deep groove receiving said member edge and the two thicknesses of said fabric, the walls of said groove being spaced less than the normal thickness of the two layers of fabric to engage and compress said fabric against said support member.

2. In a filter, in combination, a perforated support sleeve having open ends, a sleeve of filter fabric within and engaging the walls of said support sleeve, one end of said filter fabric being turned over one end edge of said support sleeve and engaging the outer walls thereof, a plate member closing the end of said sleeves and having a groove receiving the end of said support sleeve and the two thicknesses of fabric, the walls of said groove compressing said two thicknesses of fabric tightly against said support sleeve.

3. In a filter, in combination, a perforated support sleeve having open ends, a sleeve of filter fabric, one of said sleeves fitting closely within the other, said fabric sleeve having one end extending beyond the corresponding end of the supporting sleeve and turned thereover to engage a portion of the free wall thereof, a cupped end member fitted within the end of said support sleeve and a peripheral flange on said cupped member engaging the fabric and compressing it against the support sleeve and against said cupped member.

4. In a filter, in combination, a perforated support sleeve having open ends, a sleeve of filter fabric, one of said sleeves fitting closely within the other, said fabric sleeve having its ends extending slightly beyond the corresponding ends of the supporting sleeve and being there turned over and onto the free wall thereof, a plate closing each end of said sleeves, each plate having a groove receiving the end of said support sleeve and having walls compressing the fabric on both the inner and outer wall of the supporting sleeve, a casing surrounding said sleeves and spaced from the cylindrical walls thereof, said casing comprising two cup-like members having their open ends secured together and having closed ends directly engaging and supporting said plates.

5. In a filter, in combination, a perforated support sleeve having open ends, a sleeve of filter fabric, one of said sleeves fitting closely within the other, said fabric sleeve having its ends extending slightly beyond the corresponding ends of the supporting sleeve and being there turned over and onto the free wall thereof, a plate closing each end of said sleeves, each plate having a groove receiving the end of said support sleeve and having walls engaging and compressing the fabric against the inner and outer wall thereof, a portion of each plate being cupped outwardly beyond the bottom of its groove, a casing surrounding said sleeves and spaced from the cylindrical walls thereof, said cupped portions of said plates spacing and supporting said plates from the end members of said casing.

6. In a filter, in combination, a perforated support sleeve having open ends, a sleeve of filter fabric, one of said sleeves fitting closely within the other, said fabric sleeve having its ends extending slightly beyond the corresponding ends of the supporting sleeve and being there turned over and onto the free wall thereof, a plate closing each end of said sleeves, each plate having a groove receiving the end of said support sleeve and having walls engaging and compressing the fabric against the inner and outer wall thereof, a portion of each plate being cupped outwardly beyond the bottom of its groove, a casing surrounding said sleeves and spaced from the cylindrical walls thereof, said cupped portions of said plates spacing and supporting said plates from the end members of said casing, a passage into said casing and a passage through the casing and one plate into the interior of said sleeves.

7. In a filter for the oil of an automotive engine, in combination, an outer casing having an outlet passage, a filtering cylinder within said casing and having a plate at one end, a projection on said plate engaging a wall of said casing, a sput formed outwardly from the metal of said casing to make an opening therethrough, a fitting having attaching means for a tube thereon and having a pressed fit in said sput and an extension on said fitting passing through said projection and secured thereto in an oil-tight manner.

In testimony whereof we hereunto affix our signatures.

ARTHUR A. BULL.
TORLEIF I. LARSEN.